May 3, 1932.  E. FLENTJE  1,856,325
SHOCK ABSORBER
Filed Sept. 13, 1930  2 Sheets-Sheet 1
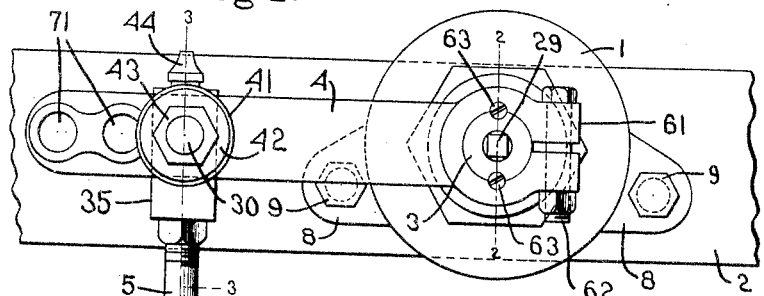
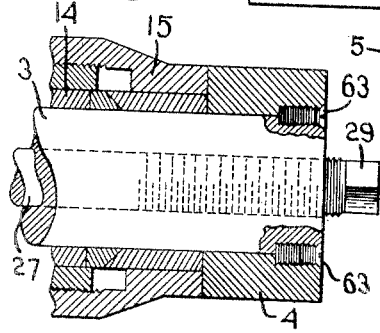
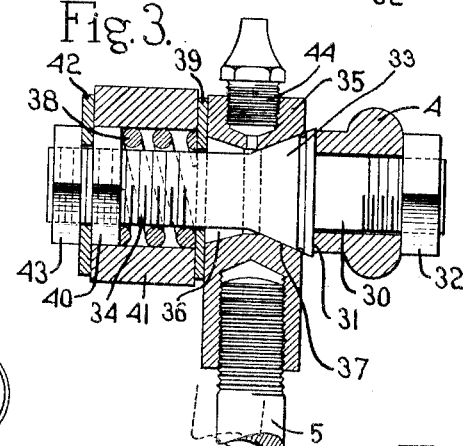
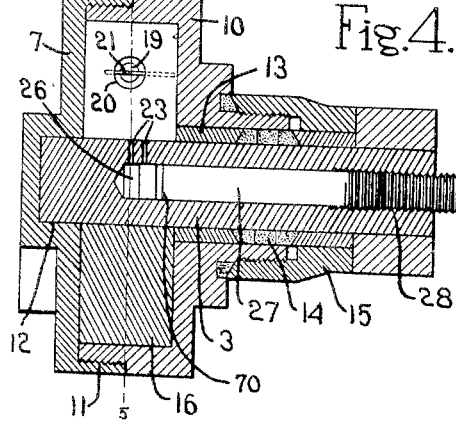
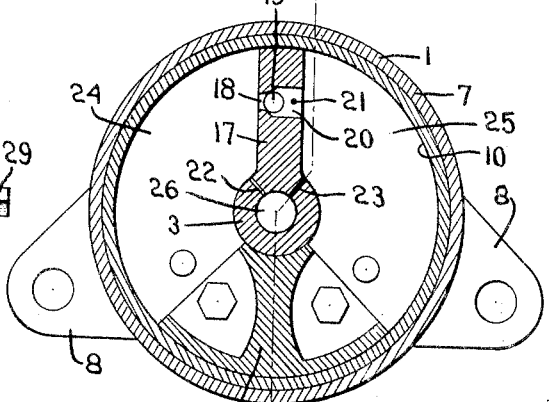
Inventor.
Ernst Flentje
by Heard Smith & Tennant.
Attys.

May 3, 1932.  E. FLENTJE  1,856,325
SHOCK ABSORBER
Filed Sept. 13, 1930  2 Sheets-Sheet 2
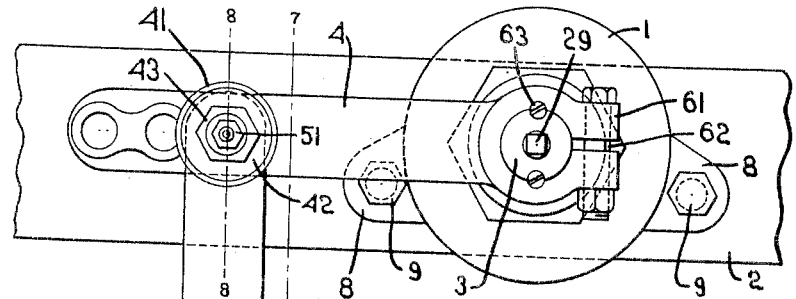
Fig. 6.
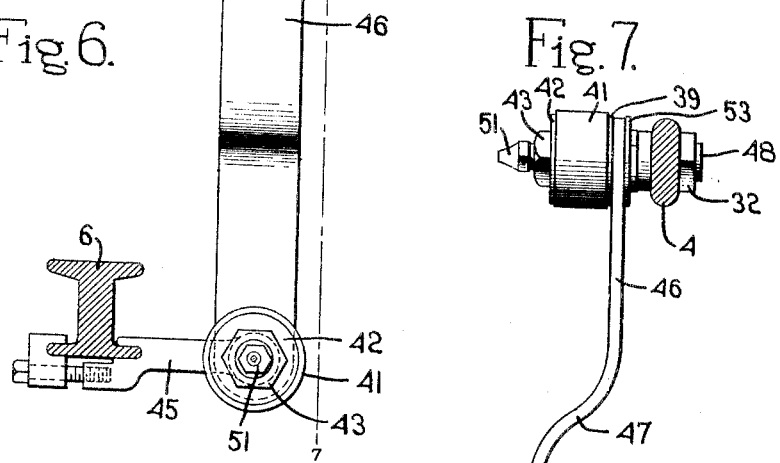
Fig. 8.
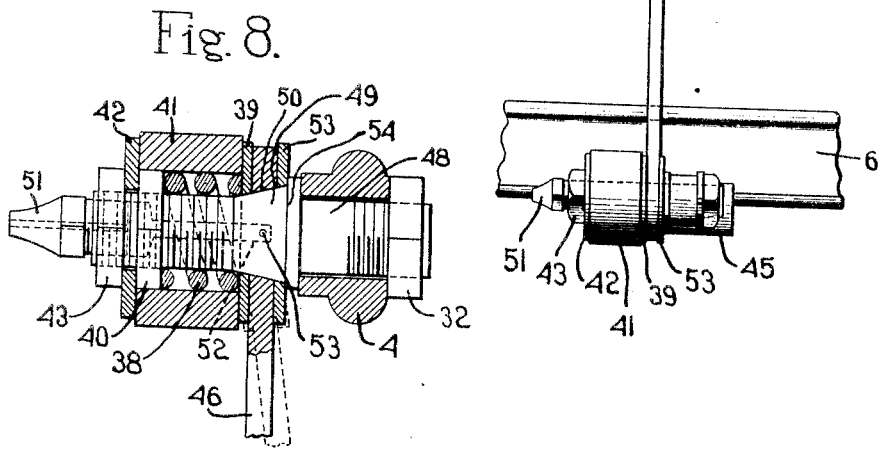
Inventor.
Ernst Flentje
by Heard Smith & Tennant.
Attys.

Patented May 3, 1932

1,856,325

UNITED STATES PATENT OFFICE

ERNST FLENTJE, OF CAMBRIDGE, MASSACHUSETTS

SHOCK ABSORBER

Application filed September 13, 1930. Serial No. 481,763.

This invention relates to shock absorbers such as are used on automobiles, and particularly to the type of shock absorber illustrated in my Patent No. 1,564,227, dated December 8, 1925, which includes a cylindrical casing secured to the chassis of the automobile, a shaft journalled in said casing and having an arm which is connected by a link connection to the axle of the automobile and means within the casing for retarding the turning movement of the shaft.

One of the objects of the present invention is to provide an improved connection between the arm of the shaft and the link which is flexible so as to permit the link to swing into different angular positions and with relation to the arm to accommodate relative motion between the body and axle of the automobile.

Another object of the invention is to provide a shock absorber of this type with improved means for regulating the retarding action of the means which retards the rotative movement of the shaft.

Other objects of the invention are to improve generally shock absorbers for automobiles in the particulars hereinafter set forth.

In order to give an understanding of the invention I have illustrated in the drawings a selected embodiment thereof which will now be described after which the novel features will be pointed out in the appended claims.

Fig. 1 is a view showing a shock absorber embodying my invention.

Fig. 2 is an enlarged section on the line 2—2, Fig. 1;

Fig. 3 is an enlarged section on the line 3—3, Fig. 1;

Fig. 4 is a section through the cylindrical casing on the line 4—4, Fig. 5;

Fig. 5 is a section on the line 5—5, Fig. 4;

Fig. 6 is a view similar to Fig. 1 but showing a different embodiment of the invention;

Fig. 7 is a section on the line 7—7, Fig. 6;

Fig. 8 is a section on the line 8—8, Fig. 6.

The shock absorber herein shown is of the type which comprises a cylindrical casing 1 adapted to be secured to the chassis 2 of an automobile and in which is journalled a shaft 3 having an arm 4 fast thereof, which arm is connected by a link connection (5 in Fig. 1 and 46 in Fig. 6) to the axle 6 of the automobile, there being suitable retarding means within the casing 1 to retard the rotative movement of the shaft.

As herein shown the casing 1 is formed with the base portion 7 which is provided with ears 8 that are attached to the chassis 2 by means of suitable bolts 9 and is also formed with the body portion 10 which is screw threaded to the base 1 as shown at 11. The shaft 3 extends through the body portion 10 and one end of it is journalled in a bearing 12 formed in the base portion 7, said shaft also finding bearing in the bearing sleeve 13 carried by the body portion 10.

A tight joint around the shaft 3 is provided by the packing 14 in a suitable stuffing box 15.

The means within the casing 1 for retarding the rotative movement of the cylinder is of the usual type which comprises a fixed partition member 16 extending radially from the shaft 3 to the periphery of the casing and a blade 17 fast on the shaft 3 and extending from the shaft to the opposite side of the casing, said blade having a port 18 therein controlled by a check valve 19 which is herein shown as a ball valve retained within a recess 20 of the blade by means of guard member 21.

The casing is filled with liquid as usual in shock absorbers of this type.

The construction is such that when the automobile spring is compressed, or when the axle and chassis member 2 have a movement toward each other, the shaft 3 will be turned anti-clockwise Fig. 5 thereby swinging the blade to the left while when the spring recoils the shaft and blade will turn in the opposite direction.

The swinging movement of the blade 17 is only permitted, however, as the liquid is transferred from one side of the blade to the other or from one of the spaces 24, 25 to the other. There is a constantly open restricted port forming communication between said spaces 24, 25 on opposite sides of the blade 17. This port is in the form of two passages 22 and 23 which communicate with the two spaces 24 and 25 respectively and both of which communicate with a central bore 26 of the shaft 3. The restricted ports 22, 23 will only permit a relatively slow turning movement of the shaft 3.

The ball valve 19 is so arranged that it will open when the blade 17 moves to the left Fig. 5 due to compression of the automobile spring thereby permitting relatively free turning movement of the shaft 3. When the spring recoils, however, and the blade tends to move in the oppoiste direction, or to the right, the valve 19 will close and the return movement of the blade can take place only as fast as the liquid can be passed through the restricted ports 22, 23.

Means are provided for varying the size of these restricted ports 22, 23 thus providing for adjusting the retarding effect of the shock absorber. There are two or more ports similar to 22 and also two or more ports similar to 23 as best seen in Fig. 4.

Situated within the shaft 3 is a control member 27 which has screw-threaded engagement with the shaft as shown at 28 and which projects beyond the shaft as shown at 29, the projecting end being squared to form a wrench-receiving portion. The control member 27 may thus be adjusted axially of the shaft and may be adjusted to cut off one or more of the ports 22, 23 thus controlling the retarding effect of the shock absorber.

The control member is so constructed that in no position thereof will it be possible to entirely close the ports 22, 23. This member is provided with a groove 70 which is so situated that when the control member is screwed into the shaft and reaches a position in which the left hand ports 22, 23 are cut off said groove will be in registry with the right hand ports. Hence in every position of the control member there will be a communication between the two spaces 24 and 25 and hence there is no danger that the blade 17 will become locked through the closing of the ports 22, 23 by an improper adjustment of the control member 27.

One feature of the present invention relates to a novel flexible connection between the link 5 or 46 and the arm 4 which permits the link to swing into different angular positions relative to the arm. As shown in Figs. 1 and 3 the arm 4 has a stud 30 rigidly secured thereto to which the link 5 is attached.

The stud is shown as having a shoulder 31 engaging one side of the arm 4 and said stud is rigidly fastened to the arm by means of a clamping nut 32 screw-threaded to the stud. The stud is also formed with a conical portion 33 on which the link 5 is mounted and with a screw-threaded portion 34 beyond the conical portion 33.

In the construction shown in Fig. 1 the link 5 is in the form of a rod which is screw threaded to a head member 35, said member being provided with the opening 36 through which the stud extends. This opening has the tapered portion 37 into which the conical portion 33 of the stud enters. Spring means are provided which act on the head 35 of the link and hold it onto the conical portion of the stud. This spring means is in the form of a spring 38 which surrounds the portion 34 of the stud and is confined between a nut 40 that is screw threaded to the portion 34 of the stud and a washer 39 which bears against the head 35.

The spring 34 is shown as enclosed in a cylindrical covering member 41 of rubber hose, said member being confined between the washer 39 and a washer 42 which is clamped against the nut 40 by another nut 43.

This connection allows the arm to pivot on the stud to take care of any up and down movement and it also allows a lateral movement of the arm in a direction transversely of the automobile as indicated by the full and dotted lines Fig. 3. The connection thus not only allows the necessary pivotal movement between the link 5 and the arm 4 to provide for the up and down swinging movement of the arm but also the necessary lateral movement to allow for a relative sidewise movement between the chassis and the axle such as inevitably occurs when the automobile is moving over a rough surface.

The bearing between the head 35 and the stud 30 may be lubricated through a suitable lubricating attachment 44. A similar connection is provided at the lower end of the link 5 between the latter and the bracket member 45 by which the link is attached to the axle 6.

In Figs. 6 to 8 I have illustrated a different embodiment of the invention wherein the link member is made of a strip of strip steel which is constructed to not only provide lateral resiliency but also, to a certain extent, longitudinal resiliency. In this embodiment the link member is shown at 46 and it is illustrated as being bent to provide the offset portion 47.

In the construction shown in Figs. 6 to 8 there is provided the stud member 48 which is similar to the stud 30, said stud member having the conical portion 49 on which the link 46 is mounted. The upper end of the link is provided with the opening 50 through which the stud extends and in which the conical portion of the stud is received and the end of the link is retained on the conical portion by the same spring means illustrated in Fig. 3 and above described.

In this embodiment, however, the bearing between the link 46 and the conical portion 49 of the stud 48 is lubricated through a lubricating connection 51 that is attached to the end of the stud, said stud being provided with an axial grease duct 52 leading to a transverse port 53 through which the grease is delivered to the bearing surface. In this embodiment too the end of the link 46 is confined between the washer 39 and another washer 53 which engages a shoulder 54 at the large end of the conical portion 49.

A similar connection is provided between the lower end of the link 46 and bracket member 45. The link construction shown in Figs. 6 to 8 not only provides the necessary pivotal connection between the link and the arm 4 but also the desirable lateral flexible connection as indicated by the full and dotted lines Fig. 8. Furthermore, the shape of the link with the offset portion 47 is such that it will have a certain degree of longitudinal resiliency which is desirable in helping to eliminate shock.

The arm 4 is shown as provided with a plurality of apertures 71 into any one of which the stud 30 may be anchored. This provides an adjustability of the shock absorber which adapts it for various makes of automobiles. The arm 4 is shown as being bifurcated at the end which encircles the shaft 3 as indicated at 61 and the split or bifurcated arm is clamped to the shaft through the clamping bolt 62.

As a further means of anchoring the arm to the shaft I have shown screws 63 which are screw threaded into apertures formed partly in the shaft 3 and partly in the arm 4. The location of these screws is such that the clamping action of the bifurcated end of the arm serves to lock the screws in place.

I claim:

1. In a pivotal connection between two members, the combination with said members, one of which has an opening therethrough, of a stud secured to the other member and projecting through said opening, the portion of the stud occupying said opening being conical, a cover fast on the projecting end of the stud, a spring encircling the stud and confined between said cover and said member with the opening, said spring yieldingly holding said member in engagement with the conical portion of the stud, and a sleeve encircling and enclosing the spring.

2. In a pivotal connection between two members, the combination with said members, one of which has an opening therethrough, of a stud secured to the other member and projecting through said opening, the portion of the stud occupying said opening being conical, a cover fast on the projecting end of the stud, a spring encircling the stud and confined between said cover and said member with the opening, said spring yieldingly holding said member in engagement with the conical portion of the stud, and a sleeve of resilient material encircling the stud and spring and enclosing the latter.

In testimony whereof I have signed my name to this specification.

ERNST FLENTJE.